United States Patent [19]

Lawrence

[11] Patent Number: 4,562,337

[45] Date of Patent: Dec. 31, 1985

[54] SOLDER POT

[75] Inventor: William Lawrence, Palos Verdes Estates, Calif.

[73] Assignee: Eldon Industries, Inc., Inglewood, Calif.

[21] Appl. No.: 615,388

[22] Filed: May 30, 1984

[51] Int. Cl.$^4$ ............................................. F27B 14/06
[52] U.S. Cl. .................................... 219/421; 219/239; 219/425; 219/426; 219/439; 219/523; 219/552; 219/442; 228/56.1
[58] Field of Search ...................... 219/85 R, 129, 226, 219/236, 237, 238, 239, 420, 421, 423, 425, 426, 427, 439, 523, 441, 442, 552, 541; 222/146 HE; 228/51, 55, 56; 118/421

[56] References Cited

U.S. PATENT DOCUMENTS

| | | |
|---|---|---|
| 2,908,796 | 10/1959 | Reichelt et al. ....................... 219/421 |
| 3,172,383 | 3/1965 | Emanus ............................ 219/421 X |
| 3,293,412 | 12/1966 | Profitt et al. ......................... 219/421 |
| 3,513,295 | 5/1970 | Knowles ............................. 219/425 |
| 3,584,190 | 6/1971 | Marcoux ............................ 219/233 |
| 3,593,677 | 7/1971 | McLain .. ............................ 118/206 |
| 3,629,543 | 12/1971 | Mayhew et al. ........................ 219/85 |
| 4,035,613 | 7/1977 | Sagawa et al. ...................... 219/552 |
| 4,082,940 | 4/1978 | Knowles et al. ..................... 219/239 |
| 4,431,903 | 2/1984 | Riccio .................................. 219/238 |
| 4,463,247 | 7/1984 | Lawrence et al. ..................... 219/236 |

FOREIGN PATENT DOCUMENTS 2064396 6/1981 United Kingdom ................ 219/237

Primary Examiner—Volodymyr Y. Mayewsky
Attorney, Agent, or Firm—K. H. Boswell; Edward D. O'Brian

[57] ABSTRACT

An electrical solder pot has a base with a hollow interior. A housing member also having a hollow interior attaches to the top of the base. The housing member further includes an opening at its top. A threaded socket is fitted in the base so as to accept a heating element which is oriented vertically within the hollow interior of the combined base and housing member. The heating element includes a threaded connector positioned near the opening in the top of the housing and accepts a threaded solder container. The solder container attaches to the top of the heating element and is positioned above the opening in the housing. The heating element includes an internal thermal conducting member located within a tube with an appropriate socket connector on the tube so as to connect to the socket in the base. A monolithic burnt ceramic heater is positioned within a cavity in the thermal conducting member. A resistance element integrally formed in the ceramic element is electrically connected to the socket whereby heat passes from the resistance element to the thermal conducting member and then to the solder container.

21 Claims, 4 Drawing Figures

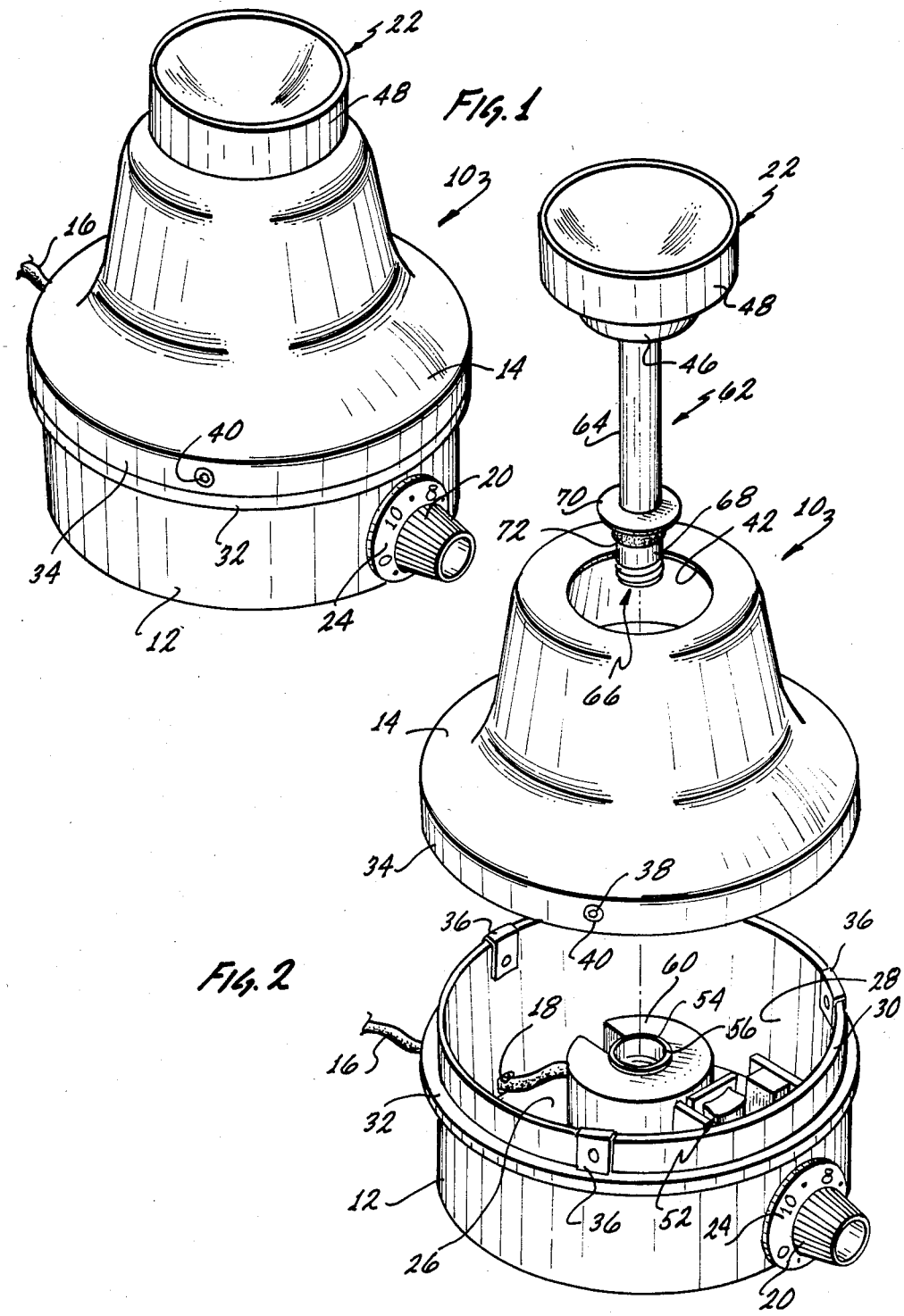

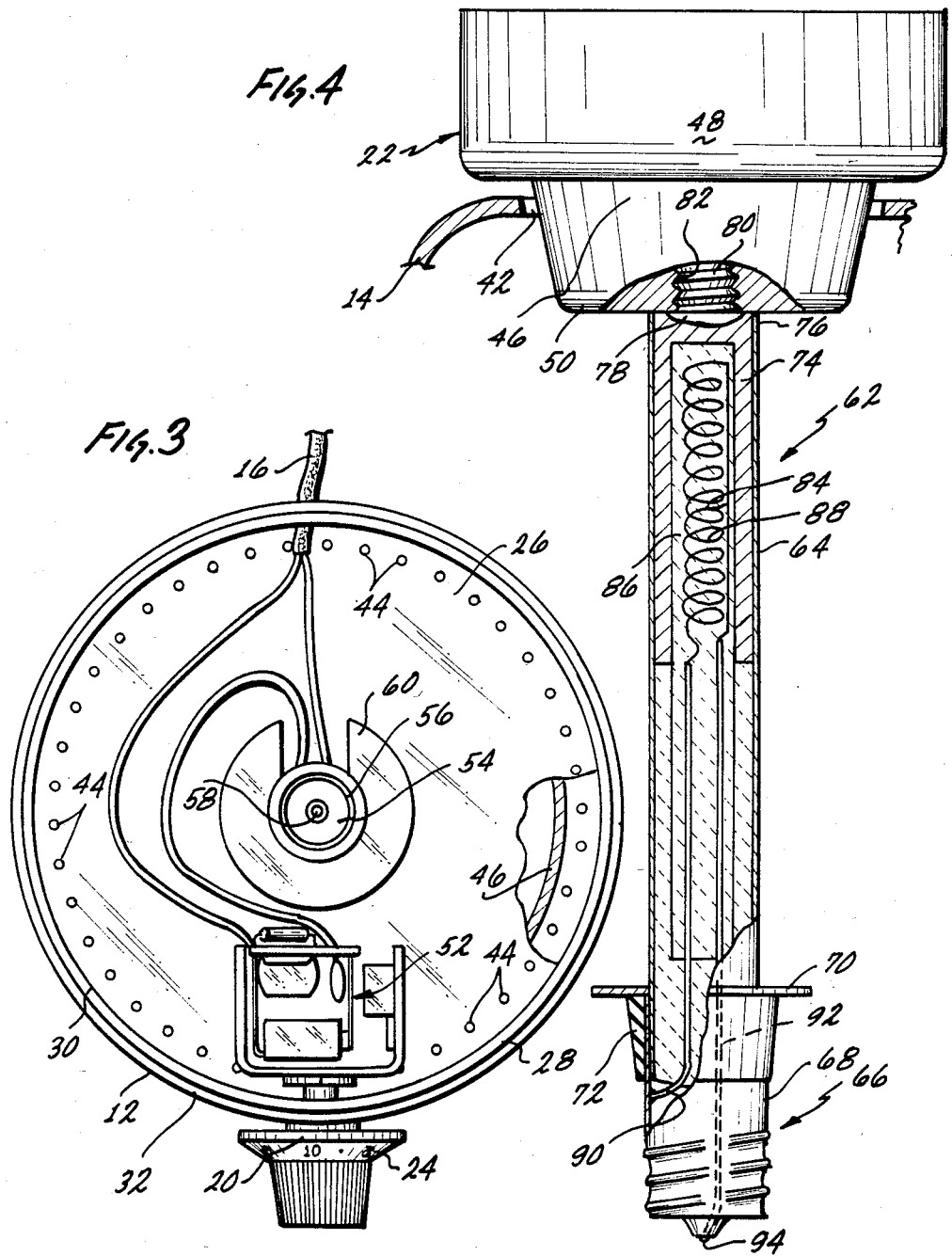

SOLDER POT

BACKGROUND OF THE INVENTION

This invention is directed to a solder pot which utilizes a replaceable heating member which includes a monolithic ceramic element having resistance wires integrally formed therein which transfer heat to a thermal conducting member.

Solder pots are utilized to hold an amount of solder at a particular temperature for an extended period of time. This is very useful in certain assembly or other similar operations where it is necessary to repeatedly tin the soldering iron or the like. One such known soldering pot uses a typical nichrome wire heating element of the type found ten to fifteen years ago in soldering irons, wood burners and the like.

It is difficult to obtain a constant temperature output from these older style nichrome heating elements. In view of this, the above known solder pot included a bi-metal strip located in association with the container for the solder which served as one arm of a set of contact points which were wired in series with the heating elements. This served as a thermostat to regulate the temperature of the heating element.

This type of control, however, is disadvantageous in that continuous arcing across the contact points ultimately leads to deterioration of the same, with ultimate failure of the thermostat. Unless the thermostat is replaceable, failure of the thermostat would lead to ultimate failure of the solder pot.

Further, use of these bi-metal strips as thermostats represents a very imprecise method of temperature control. When the contact points controlled by the bi-metal strip are opened, this shuts off current flow to the resistance heating element. However, the residual heat in the resistance heating element, even after the bi-metal strip has flexed and opened the contact points, is still transferred to the container for the solder, elevating the container and the solder therein to a temperature higher than that at which the bi-metal strip flexes and opens the contact points. This is, in essence, an overshoot of the desired temperature. In order to overcome this problem in the prior known devices, the contact points would have to be set to open at a temperature less than the desired temperature of the solder in the solder container. this required a certain amount of trial and error in order to achieve the preferred solder temperature.

BRIEF DESCRIPTION OF THE INVENTION

In view of the above, it is believed that there exists a need for new and improved solder pots. It is therefore a broad object of this invention to provide such an improved solder pot. It is a further object of this invention to provide for a solder pot that has a readily replaceable heating element allowing for ease of replacement should failure of the heating element occur, or replacement of the heating element with a further element having different characteristics. Additionally, it is an object of this invention to provide a device which because of its simplicity is easily and economically manufactured, yet because of the engineering principles incorporated therein, is capable of giving a long and useful service lifetime.

These, and other objects as will become evident from the remainder of this specification, are achieved in a solder pot which comprises: a hollow base having a bottom wall and a continuous side wall extending upwardly from said bottom wall; a hollow housing member attaching to the upper periphery of said side wall of said base, said housing member extending from said side wall of said base upward to an upper terminus, said upper terminus including an opening located therein; an electrical socket means located on the inside of said bottom wall of said base within said hollow interior of said base; an electrical control means located on said base, said electrical control means electrically connected to said electrical socket means for controlling power supplied to said electrical socket means; means for supplying electrical power to said electrical socket means and said electrical control means, said latter means electrically connected to said socket means and said control means whereby electrical power is supplied to said electrical socket means; an elongated heating means for generating heat, said heating means including an outer tube having first and second ends, a socket connector means located at said first end of said tube; said heating means further including an elongated metallic heating means further including an elongated metallic thermal conducting member having a cavity end and a connecting end, said thermal conducting member of a shorter elongated dimension than said tube, said thermal conducting member located in said tube with said connecting end positioned at said second end of said tube and said cavity end located between said first and said second ends of said tube, said thermal conducting member including a container connector located at said connecting end and positioned so as to extend out of and be exposed out of the second end of said tube, said thermal conducting member including a cavity means, said cavity means having an opening at least a part of which is located at said cavity end of said thermal conducting member; said heating mean further including a monolithic burnt ceramic element having an electrical resistance means integrally formed within the interior of said ceramic element and first and second electrical connectors leading from said resistance means to the exterior of said ceramic element, said ceramic element sized and shaped so as at least a part of said ceramic element fits within said cavity within said thermal conducting member in an intimate relationship with said thermal conducting member so as to allow heat to transfer from said ceramic element to said thermal conducting member, said first and said second electrical connectors electrically connected to said socket connector means; said socket connector means on said heating means mating with said electrical socket means on said base to physically and electrically connect said heating means to said electrical socket means; a solder container having an upwardly extending opening, said solder container attaching to said heating means container connector so as to physically hold said solder container on said heating means and to thermally connect said thermal conducting member to said heating means so as to allow heat transfer from said thermal conducting member to said solder container.

In the illustrative embodiment of the invention, a plurality of passageways are provided in the base with the opening in the housing oversized with respect to either the solder container or the heating element, such that a draft or chimney is created through the interior of the device which serves to cool both the base and the housing and certain of the internal components such as the electrical control means.

In the preferred embodiment, the electric control means is a variable rheostat, allowing for setting the power level to the heating means for maintaining a constant temperature of the solder container.

BRIEF DESCRIPTION OF THE DRAWINGS

This invention will be better understood when taken in conjunction with the Figures, wherein:

FIG. 1 is an isometric view of an illustrative embodiment of the invention;

FIG. 2 is an exploded view of FIG. 1;

FIG. 3 is a plan view of the base portion of the invention as seen in FIG. 2; and FIG. 4 is a side elevational view in partial section of the uppermost components exploded out of FIG. 2.

This invention utilizes certain principles and/or concepts which are set forth in the claims appended to this specification. Those skilled in the electrical arts will realize that these principles and/or concepts are capable of being applied to a variety of embodiments which may differ from the exact embodiment utilized for illustrative purposes herein. For this reason, this invention is not to be construed as being limited only to the illustrative embodiment, but should only be construed in view of the claims.

DETAILED DESCRIPTION OF THE INVENTION

A solder pot 10 illustrative of this invention is seen in the Figs. The solder pot 10 includes a base 12 to which is attached a housing 14. An appropriate electrical line 16 leads through a hole 18 to the interior of the base 12.

A control knob 20 projects out of the base 12 and is utilized to set a rheostat or to turn the solder pot 10 off and on as hereinafter described. At the upper terminus of the housing 14 is a solder container 22 which is designed to include an upward facing opening so as to form a depression for retaining molten solder therein.

In operation, an appropriate amount of solder is located in the solder container 22 and the electrical line 16 is connected to a source of power by plugging in the same in a standard manner. The knob 20 is turned to the "on" position and to one of the various settings, as indicated by the indicia 24 located thereon, to achieve a desired temperature within the solder container 22 to melt solder loaded therein and to maintain the solder in a fluid state.

It is evident that the solder pot 10 could be utilized for melting and/or holding other fluids at a particular temperature, such as for gluing operations or the like.

The base 12 includes a bottom wall 26 and a continuous side wall 28 attached thereto. The side wall has a skirt 30 on its upper periphery and a flange 32 which divides the skirt from the remainder of the side wall. The housing 14 is somewhat bell shaped, with its lowered flared perimeter 34 fitting over the skirt 30 and resting against the flange 32.

Three clip nuts 36 rest on the skirt 30 over appropriate holes drilled through the skirt. Mating holes 38 in the lower perimeter 34 of the housing 14 align with the clip nuts 36 such that screws, collectively identified by the numeral 40, can be utilized to attach the housing 14 to the base 12.

The housing 14 tapers in a smooth curve upwardly from the lower perimeter 34 up over its upper periphery and culminates in a large opening 42 in its top surface. The totality of the interior of the solder pot 10 defined by the base 12 and the housing 14 is hollow. This allows for an insulative air space between certain heating elements as hereinafter described and the outside surfaces of both the base 12 and the housing 14.

In the bottom wall 26 of the base 12 are a plurality of air passageways, collectively identified by the numeral 44. These are noted as being located in the bottom wall of the base 12; however, alternately they could be in the side wall of the base 12. In any event, as seen in the broken section of FIG. 3, a circular rim 46 is formed on the bottom surface of the bottom wall 26 so as to raise the bottom surface of the bottom wall 46 upward from a support surface on which the solder pot 10 rests. The rim 46 is placed radially inwardly from the air passageways 44. This allows for air circulation underneath the bottom wall 26 at least to those areas wherein the air passageways 44 open, such that air can be drawn up through the air passageways 44 into the interior of the solder pot 10.

The solder container 22 has an upper portion 48 and a lower portion 46, which are integrally formed together as a monolithic body out of, preferredly, a metallic material, capable of good heat conduction. The opening 42 in the top of the housing 14 is oversized with respect to the lower portion 50 of the solder container 22. This allows for formation of an air space between the actual walls of the housing 14 and the side edges of the solder container 22. This air space communicates between the ambient and the interior of the solder pot 10. A chimney effect is created within the interior of the solder pot 10 because of the air passageways 44 located in the bottom wall 26 of the base 12 and the air gap within the opening 42 between the lower portion 50 of the solder container and the edge of the housing 14. If the interior of the solder pot 10 is heated by the heater element hereinafter identified, hot air within the interior rises out of the gap between the housing 14 and the solder container 22 and cool ambient air is sucked in through the air passageways 44 in the base 12. This cools the interior of the walls of the base 12 and the housing 14 so as to maintain them at a relatively cool temperature and further cools other internal components associated with the control knob 20.

The rim 46 is of a diameter sufficiently greater than the diameter of the solder container 22 so as to provide for stability of the solder pot 10 on a support surface. This prevents tipping or the like of the solder pot 10 with inadvertent discharge of hot molten solder or the like from the solder container 22.

The electrical line 16 serving as a means for supplying electrical power to the solder pot 10 is connected in series with a rheostat 52 and a cantilever socket 54. The rheostat 52 is a standard off the shelf control module such as a 200 watt incandescent bulb dimmer switch. It includes an off and on function to make or break the circuit within the above noted series connection. Further, the rheostat 52 includes an electrical winding, not separately numbered or identified, to create a variable resistance. The socket 54 includes an outer contact element 56 and a center contact element 58 with the outer contact element 56 being formed as a standard internal female thread socket, so as to receive a standard threaded male socket component part. The socket 54 is supported in a thick walled portion 60 integrally formed with the bottom wall 26 of the base 12. This provides for stability of the physical mounting of a chain of parts between the base 12 and the container 22 to provide for stability of the container 22 on the solder pot 10, without interfering with the gap between the lower portion 50 of the solder container 22 and the walls of the housing 14.

A heating member 62 is similar in construction to that described in my U.S. Pat. No. 4,463,247, entitled "Soldering Iron Having Electrical Heating Unit With Improved Heating Transfer Characteristics", which stems from U.S. application Ser. No. 440,862, filed Dec. 6, 1982, the entire disclosure of which is herein incorporated by reference. The heating member 62 includes a tube 64 preferredly formed of a stainless steel or similar material, which is mated with a male socket member 66 formed on first end 68 of the tube 62. A heat deflecting flange 70 is located around the first end 66 of the tube 64. An insulative bushing 72 circles portions of the heat deflection flange 70.

Located in approximately the upper half of the tube 64 is a thermal heat conducting member 74. The member 74 is sealed to the upper, or second, end 76 of the tube 64 by appropriately swage fitting it into tube 64. The member 74 is preferredly formed of a metallic material having heat conducting properties.

The upper (or container) end 78 of the member 74 includes a threaded boss 80 which is integrally formed with the remainder of the body of the thermal conducting member 74. This threaded boss 80 fits into an appropriate threaded opening 82 formed in the solder container 22. This allows for easy and convenient attachment of the container 22 to the remainder of the solder pot 10 and further allows for adaptability of the solder pot 10 so as to be able to receive different sizes and shapes of containers 22, depending upon the specific application for which the solder pot 10 is utilized. In any event, the solder container 22 conveniently attaches to the heat member 62 by simply screwing on to the boss 80. Since the boss 80 is integrally formed with the remainder of the thermal conducting member 74, excellent heat transfer between the thermal conducting member 74 and the solder container 22 is achieved.

The thermal conducting member 74 includes a cavity 84 formed therein. In the illustrative embodiment of the figures, the cavity 84 is formed as a cylindrical cavity which opens downwardly. The cavity 84 receives the upper portion of a monolithic burnt ceramic element 86. The cavity 84 is sized and shaped so as to intimately mate with the ceramic element 86. Preferredly the ceramic element 86 would be appropriately mechanically attached to the member 74 with a high temperature glue or the like, with its upper portion permanently encased within the cavity 84. Since the thermal conducting member 74 is of a shorter lengthwise dimension than is the tube 64, a portion of the ceramic element 86 extends downwardly beyond the lower or cavity end of the thermal conducting member 74.

The ceramic element 86 includes a resistance element 88 which is intimately located within the matrix of the monolithic burnt ceramic element 86. The construction of this type of ceramic element is as is described in U.S. Pat. No. 4,035,613, and references cited therein. That patent and its references are herein incorporated by reference.

Also encapsulated within the matrix of the ceramic element 86 are connectors 90 and 92 leading to the resistance element 88. In construction of the heating element 62 one of these, connector 90, is electrically attached to the electrical conducting male socket member 88 with the second connector 92 electrically attached to a central contact 94 on the bottom of the heating element 62 which is electrically insulated from the male socket member 68. When the heating member 62 is appropriately threaded into the cantilever socket 54, a circuit is completed through the resistance element 88 via the male socket member 68 and the connector 90 and the contact 94 and the connector 92.

The resistance element 88 is only located in the upper portion of the ceramic element 86. As such, it is only necessary for the thermal conducting member 74 to extend downward within the tube for a distance equal to the approximate portion of the ceramic element 86 wherein the resistance element 88 is located.

The ceramic element 88 has excellent heat recovery and heat output characteristics. As such, it is preferred over older style nichrome winding type heating elements. Insofar as there is intimate contact between the ceramic element 86 and the thermal conducting member 74, and insofar as the area of contact of these two members is very close to the solder container 22, the heat output of the soldering pot 10 is located only in the upper portion of the hollow interior near the opening 42 in the housing 14. This further contributes to maintaining the surface of the housing 14 and the base 10 relatively cool for ease and convenience of the user of the soldering pot 10.

The ceramic heating element 86 is very stable in its output with respect to the current supplied thereto and as such when used in conjunction with a standard rheostat such as the the rheostat 52, very reproducible heat outputs are achieved with excellent temperature stability. Further, since a variety of different ceramic heating elements 86 can be constructed with the wattage output of these differing, this combined with the ease of exchangeability of the heating member 66 by simply screwing and unscrewing them from the cantilever socket 54 leads to great versatility in use of the soldering pot 10. The operator of the same can easily and conveniently change from one heating member 62 to another by simply unscrewing the combination of the soldering container 22 and the heating member 66 and lifting the same out of the soldering pot 10 through the opening 42 in the housing 14.

For the illustrative embodiment, I have shown a round cavity 84 in the thermal conducting member 74. Other geometries of cavity shape and ceramic heating element shape are also useful. Included would be flat bladed heaters and the like which would require that the cavity in the thermal heating member 74 be rectilinear so as to accept the flat bladed heater.

In my application Ser. No. 541,356, the entire contents of which are herein incorporated by reference, I describe certain soldering irons which are utilized in conjunction with flat bladed heaters or cylindrical heaters such as the ceramic element 86. While these are not utilized with a socket type heating member as per heating member 62 herein, it is evident that obvious modifications to the size and geometry of the cavity 84 and the ceramic element 86 could be made so as to incorporate other geometries and even multiple heating elements as is disclosed in that application.

Further, in U.S. Pat. No. 4,431,903, assigned to the same assignee as is this application, a flat bladed heater is utilized in conjunction with a heat sink which has a flat side with a spring utilized to maintain the flat bladed heater in conjunction with the flat side of the heat synch. Such a geometry could also be utilized within the heating member 62 of this application by resorting to certain design changes. Therefore, for the purposes of this application, the term cavity should be construed so as to include open sided cavities such as that disclosed for the tip member 72 of U.S. Pat. No. 4,431,903.

I claim:

1. An electrical soldering pot which comprises:

a hollow base having a bottom wall and a continuous side wall extending upwardly from said bottom wall;

a hollow housing member attaching to the upper periphery of said side wall of said base, said housing member extending from said side wall of said base upward to an upper terminus, said upper terminus including an opening located therein;

an electrical socket means located on the inside of said bottom wall of said base within said hollow interior of said base;

an electrical control means located on said base, said electrical control means electrically connected to said electrical socket means for controlling power supplied to said electrical socket means;

means for supplying electrical power to said electrical socket means and said electrical control means, said latter means electrically connected to said socket means and said control means whereby electrical power is supplied to said electrical socket means;

an elongated heating means for generating heat, said heating means including an outer tube having first and second ends, a socket connector means located at said first end of said tube;

said heating means further including an elongated metallic thermal conducting member having a cavity end and a connecting end, said thermal conducting member of a shorter elongated dimension than said tube, said thermal conducting member located in said tube with said connecting end positioned at said second end of said tube and said cavity end located between said first and said second ends of said tube, said thermal conducting member including a container connector located at said connecting end and positioned so as to extend out of and be exposed out of the second end of said tube, said thermal conducting member including a cavity means, said cavity means having an opening at least a part of which is located at said cavity end of said thermal conducting member;

said heating mean further including a monolithic burnt ceramic element having an electrical resistance means integrally formed within the interior of said ceramic element and first and second electrical connectors leading from said resistance means to the exterior of said ceramic element, said ceramic element sized and shaped so as at least a part of said ceramic element fits within said cavity within said thermal conducting member in an intimate relationship with said thermal conducting member so as to allow heat to transfer from said ceramic element to said thermal conducting member, said first and said second electrical connectors electrically connected to said socket connector means;

said socket connector means on said heating means mating with said electrical socket means on said base to physically and electrically connect said heating means to said electrical socket means;

a solder container having an upwardly extending opening, said solder container attaching to said heating means container connector so as to physically hold said solder container on said heating means and to thermally connect said thermal conducting member to said heating means so as to allow heat transfer from said thermal conducting member to said solder container.

2. The solder pot of claim 1 wherein:
said electrical socket means comprises a cantilever socket and said socket connector means comprises a connector sized and shaped so as to fit into said cantilever socket.

3. The solder pot of claim 2 wherein:
said cantilever socket includes internal threads and said socket connector means includes external threads capable of threading into said internal threads on said cantilever socket.

4. The solder pot of claim 1 wherein:
said base includes a plurality of passageways formed in said base connecting the interior of said base to the ambient environment;
said opening in said top of said housing is sized and shaped so as to be oversized with respect to either said solder container or said heating element forming an air gap between said housing member and said solder container and said heating element whereby air can pass through said passageways in said base through the interior of said solder pot and exit through said gap so as to ventilate and cool the interior of said solder pot.

5. The solder pot of claim 1 wherein:
the upper periphery of said side wall of said base includes a skirt formed thereon and said housing member is sized and shaped so as to fit over said skirt.

6. The solder pot of claim 1 wherein:
said electrical control means includes means for varying the power supplied to said electrical socket means and said heating element connected thereto so as to control the temperature of said heating element.

7. The solder pot of claim 6 wherein:
said means for supplying electrical power comprises an electrical connector capable of connecting to a power source;
said electrical socket means and said electrical control means wired in a series circuit connection with said electrical connector and further including said electrical control means including switch means capable of making or breaking said circuit.

8. The solder pot of claim 1 wherein:
said container connector comprises a threaded boss located on said connector end of said thermal conducting member and further including said solder container having a threaded opening sized and shaped so as to receive said threaded boss.

9. The solder pot of claim 1 wherein:
said cavity in said thermal conducting member is rectilinear in shape and said ceramic element is rectilinear in shape so as to fit within said rectilinear cavity.

10. The solder pot of claim 1 wherein:
said cavity in said thermal conducting member is cylindrical in shape and said ceramic element is cylindrical in shape so as to fit within said cylindrical cavity.

11. The solder pot of claim 1 wherein:
said solder container is sized and shaped so as to have a first portion which fits within said opening in said upper terminus of said housing and a second portion which is positioned above said opening in said upper terminus of said housing with said first portion sized so as to be smaller than said opening in said upper terminus of said housing.

12. The solder pot of claim 2 wherein:
said cantilever socket includes internal threads and said socket connector means includes external threads capable of threading into said internal threads on said cantilever socket.

13. The solder pot of claim 12 wherein:
said base includes a plurality of passageways formed in said base connecting the interior of said base to the ambient environment;
said opening in said top of said housing is sized and shaped so as to be oversized with respect to either said solder container or said heating element forming an air gap between said housing member and said solder container and said heating element whereby air can pass through said passageways in said base through the interior of said solder pot and exit through said gap so as to ventilate and cool the interior of said solder pot.

14. The solder pot of claim 12 wherein:
said electrical control means includes means for varying the power supplied to said electrical socket means and said heating element connected thereto so as to control the temperature of said heating element.

15. The solder pot of claim 14 wherein:
said means for supplying electrical power comprises an electrical connector capable of connecting to a power source;
said electrical socket means and said electrical control means wired in a series circuit connection with said electrical connector and further including said electrical control means including switch means capable of making or breaking said circuit.

16. The solder pot of claim 15 wherein:
said container connector comprises a threaded boss located on said connector end of said thermal conducting member and further including said solder container having a threaded opening sized and shaped so as to receive said threaded boss.

17. The solder pot of claim 16 wherein:
said base includes a plurality of passageways formed in said base connecting the interior of said base to the ambient environment;
said opening in said top of said housing is sized and shaped so as to be oversized with respect to either said solder container or said heating element forming an air gap between said housing member and said solder container and said heating element whereby air can pass through said passageways in said base through the interior of said solder pot and exit through said gap so as to ventilate and cool the interior of said solder pot.

18. The solder pot of claim 15 wherein:
said base includes a plurality of passageways formed in said base connecting the interior of said base to the ambient environment;
said opening in said top of said housing is sized and shaped so as to be oversized with respect to either said solder container or said heating element forming an air gap between said housing member and said solder container and said heating element whereby air can pass through said passageways in said base through the interior of said solder pot and exit through said gap so as to ventilate and cool the interior of said solder pot.

19. The solder pot of claim 18 wherein:
said solder container is sized and shaped so as to have a first portion which fits within said opening in said upper terminus of said housing and a second portion which is positioned above said opening in said upper terminus of said housing with said first portion sized so as to be smaller than said opening in said upper terminus of said housing.

20. A solder pot which comprises:
a hollow base having a bottom wall and a continuous side wall extending upwardly from said bottom wall;
a hollow housing member attaching to the upper periphery of said side wall of said base, said housing member extending from said side wall of said base upward to an upper terminus, said upper terminus including an opening located therein;
an electrical socket means located on the inside of said bottom wall of said base within said hollow interior of said base;
an electrical control means located on said base, said electrical control means electrically connected to said electrical socket means for controlling power supplied to said electrical socket means;
means for supplying electrical power to said electrical socket means and said electrical control means, said latter means electrically connected to said socket means and said control means whereby electrical power is supplied to said electrical socket means;
an elongated heating means for generating heat, said heating means including an outer tube having first and second ends, a socket connector means located at said first end of said tube;
said heating means further including an elongated metallic thermal conducting member having a cavity end and a connecting end, said thermal conducting member of a shorter elongated dimension than said tube, said thermal conducting member located in said tube with said connecting end positioned at said second end of said tube and said cavity end located between said first and said second ends of said tube, said thermal conducting member including a container connector located at said connecting end and positioned so as to extend out of and be exposed out of the second end of said tube, said thermal conducting member including a cavity means, said cavity means having an opening at least a part of which is located at said cavity end of said thermal conducting member;
said heating mean further including a monolithic burnt ceramic element having an electrical resistance means integrally formed within the interior of said ceramic element and first and second electrical connectors leading from said resistance means to the exterior of said ceramic element, said ceramic element sized and shaped so as at least a part of said ceramic element fits within said cavity within said thermal conducting member in an intimate relationship with said thermal conducting member so as to allow heat to transfer from said ceramic element to said thermal conducting member, said first and said second electrical connectors electrically connected to said socket connector means;
said socket connector means on said heating means mating with said electrical socket means on said base to physically and electrically connect said heating means to said electrical socket means;

a solder container having an upwardly extending opening, said solder container attaching to said heating means container connector so as to physically hold said solder container on said heating means and to thermally connect said thermal conducting member to said heating means so as to allow heat transfer from said thermal conducting member to said solder container;

said base includes a plurality of passageways formed in said base connecting the interior of said base to the ambient environment;

said opening in said top of said housing is sized and shaped so as to be oversized with respect to either said solder container or said heating element forming an air gap between said housing member and said solder container and said heating element whereby air can pass through said passageways in said base through the interior of said solder pot and exit through said gap so as to ventilate and cool the interior of said solder pot.

21. The solder pot of claim 20 wherein:

said electrical socket means comprises a cantilever socket and said socket connector means comprises a connector sized and shaped so as to fit into said cantilever socket;

said cantilever socket includes internal threads and said socket connector means includes external threads capable of threading into said internal threads on said cantilever socket;

said electrical control means includes means for varying the power supplied to said electrical socket means and said heating element connected thereto so as to control the temperature of said heating element;

said means for supplying electrical power comprises an electrical connector capable of connecting to a power source;

said electrical socket means and said electrical control means wired in a series circuit connection with said electrical connector and further including said electrical control means including switch means capable of making or breaking said circuit.

* * * * *